United States Patent [19]

Yamaguchi et al.

[11] Patent Number: 4,813,385

[45] Date of Patent: Mar. 21, 1989

[54] GENERAL-PURPOSE INTERNAL COMBUSTION ENGINE

[75] Inventors: Yoshinobu Yamaguchi; Mutsumi Terasawa, both of Saitama; Mitsuo Sasagase, Shizuoka, all of Japan

[73] Assignees: Honda Giken Kogyo Kabushiki Kaisha, Tokyo; Toyoroki Seizo Co., Ltd., Shizuoka, both of Japan

[21] Appl. No.: 143,299

[22] Filed: Jan. 11, 1988

Related U.S. Application Data

[63] Continuation of Ser. No. 793,410, Oct. 31, 1985, abandoned.

[30] Foreign Application Priority Data

Nov. 1, 1984 [JP] Japan .................................. 59-230915
Nov. 1, 1984 [JP] Japan .................................. 59-230916
Nov. 1, 1984 [JP] Japan .................................. 59-230917
Nov. 1, 1984 [JP] Japan .......................... 59-165832[U]
Nov. 1, 1984 [JP] Japan .......................... 59-165833[U]
Nov. 1, 1984 [JP] Japan .......................... 59-165834[U]

[51] Int. Cl.$^4$ ............................................. F02B 65/00
[52] U.S. Cl. ........................................... 123/2; 55/320
[58] Field of Search .................... 123/2, 195 C, 193 C; 290/1 R, 1 A, 1 B; 55/317, 318, 320, 337

[56] References Cited

U.S. PATENT DOCUMENTS

| 3,521,726 | 7/1970 | Freyn | 123/198 E |
|---|---|---|---|
| 3,952,640 | 4/1976 | Knechler | 55/31 E |
| 4,013,105 | 3/1977 | Wuskallio | 123/198 E |
| 4,276,067 | 6/1981 | Lindman | 55/337 |
| 4,610,229 | 9/1986 | Wissmann et al. | 92/169 |

FOREIGN PATENT DOCUMENTS

| 2399200 | 3/1979 | France . |
|---|---|---|
| 2524551 | 10/1983 | France . |
| 2534626 | 4/1984 | France . |
| 27-5504 | 7/1952 | Japan . |
| 54-20689 | 7/1979 | Japan . |
| 56-50126 | 11/1981 | Japan . |
| 57-61155 | 4/1982 | Japan . |

Primary Examiner—Tony M. Argenbright
Assistant Examiner—Eric R. Carlberg
Attorney, Agent, or Firm—Armstrong, Nikaido, Marmelstein & Kubovcik

[57] ABSTRACT

A general-purpose internal combustion engine comprises an engine unit, a recoil starter, a fuel tank disposed on the engine unit, a main air cleaner disposed on the engine unit and coupled with a precleaner, and a muffler disposed on the engine unit. The main air cleaner and the muffler are disposed laterally of the fuel tank in parallel relation to each other, the main air cleaner being located closely to the recoil starter, and the muffler being disposed remotely from the recoil starter. The precleaner has an air inlet member disposed remotely from the muffler and positioned without projecting out of a plane containing a side of the main air cleaner which is remote from the muffler. The precleaner has an air outlet and the main air cleaner has a case with an air inlet defined in a side thereof and a substantially cylindrical filter housed centrally in the case coaxially with the vertical axis thereof. The air inlet has a central axis sidewardly offset a distance from a horizontal axis of the case and connected to the air outlet.

6 Claims, 4 Drawing Sheets

GENERAL-PURPOSE INTERNAL COMBUSTION ENGINE

This application is a continuation of application Ser. No. 793,410 filed Oct. 31, 1985, now abandoned.

BACKGROUND OF THE INVENTION

The present invention relates to a general-purpose internal combustion engine for use as a prime mover in various machines for agricultural, civil construction, and other uses and in various portable machines such as electric generators and pumps, and more particularly to such a general-purpose internal combustion engine having an air cleaner with a precleaner.

Internal combustion engines for use as prime movers in various machines for agricultural, civil construction, and other uses and in various portable machines such as electric generators and pumps, are often used in dusty places. Therefore, the filters in the air cleaners of such internal combustion engines are liable to get clogged soon, and have to be frequently cleaned or replaced. to avoid this shortcoming, there have been proposed general-purpose internal combustion engines as disclosed in Japanese Utility Model Publication Nos. 27-5504 and 54-20689, for example. The disclosed internal combustion engines have a main air cleaner employing a filter of paper and/or urethane foam and a cyclone-type precleaner positioned laterally of the main air cleaner. Dust-laden air is first introduced into the precleaner which removes most of the dust from the air. The air from the precleaner is then introduced into the main air cleaner through a port defined in a side thereof.

With the conventional air cleaner arrangements, however, the precleaner is simply connected to the air inlet port of the main air cleaner. The prior air cleaner structures have failed to meet the following requirements:

(a) The precleaner should not project out of the assembly of an engine, a fuel tank, a muffler, and an air cleaner, so that the precleaner would not impair the appearance of the engine assembly, would not obstruct the operation of a recoil starter, or would be damaged by being hit by an object;

(b) The precleaner should be located so as not to draw air heated by a heating body such as a muffler;

(c) The main air cleaner and the precleaner should should be interconnected by a joint duct having a small resistance to the flow of air therethrough;

(d) The precleaner should be structured so that it could easily be formed;

(e) The precleaner should be arranged so that dust discharged therefrom would not be drawn through its own air inlet port into the precleaner; and (f) The joint between the precleaner and the main air cleaner should be durable.

The filter of the main air cleaner is oval or generally cylindrical in shape and housed centrally coaxially in an air cleaner case having a complementary shape. The filtered air discharged from the precleaner is introduced into the main air cleaner case toward the vertical axis thereof and impinges substantially perpendicularly upon the outer circumferential surface of the oval or cylindrical filter, with the result that the filter portion hit by the filtered air tends to get clogged soon. Therefore, the entire circumferential surface of the filter is not effectively utilized, and it is uneconomical to clean or replace the entire filter when the other filter portion is not appreciably clogged.

The present invention has been made in an attempt to meet the aforesaid requirements of the general-purpose internal combustion engines and also to solve the above problem of the conventional air cleaner combined with the cyclone-type precleaner.

SUMMARY OF THE INVENTION

It is an object of the present invention to provide a general-purpose internal combustion engine having a precleaner attached to a main air cleaner so that the precleaner will not impair the appearance of the engine assembly, will not obstruct the operation of a recoil starter, and will not be damaged by being hit by an object, the precleaner being located so as not to introduce air heated by a heating body such as a muffler.

Another object of the present invention is to provide a general-purpose internal combustion engine having a main air cleaner and a precleaner which are interconnected by a joint duct having a small resistance to the flow of air therethrough.

Still another object of the present invention is to provide a general-purpose internal combustion engine having a precleaner structured so that it could easily be formed;

A still further object of the present invention is to provide a general-purpose internal combustion engine having a precleaner arranged so that dust discharged therefrom will not be drawn through its own air inlet port into the precleaner.

A yet still further object of the present invention is to provide a general-purpose internal combustion engine having a precleaner and a main air cleaner which are interconnected by a durable joint.

Still another object of the present invention is to increase the cleaning or replacement interval and the air purifying efficiency of the filter in an air cleaner having a cyclone-type precleaner.

According to the present invention, there is provided a general-purpose internal combustion engine comprising an engine unit, a recoil starter disposed parallel to the engine unit, a fuel tank disposed on the engine unit, a main air cleaner and a muffler disposed on the engine unit laterally of the fuel tank in parallel relation to each other, the main air cleaner being located closely to the recoil starter, the muffler being disposed remotely from the recoil starter, and a precleaner connected to the main air cleaner and having an air inlet member disposed remotely from the muffler an positioned without projecting out of a plane containing a side of the main air cleaner which is remote from the muffler.

The precleaner comprises an upper cleaner cases and a lower dust pan which are detachably coupled to each other, the upper cleaner case having an air inlet duct projecting laterally and having a lower open end, the dust pan having the air inlet member which projects laterally and opens upwardly, the air inlet member defining an air inlet port directed substantially downwardly, the cleaner case and the dust pan being coupled together with the air inlet duct and the air inlet member held in registry with each other. Each of the cleaner case and the dust pan is substantially cylindrical in shape, the air inlet duct and the air inlet member projecting tangentirally from the cleaner case and the dust pan, respectively, the dust pan having a dust outlet hole defined in a bottom thereof and opening away from the air inlet port.

The precleaner has an integral air duct at its upper portion, the air duct having an air outlet at an outer end thereof, the main air cleaner having an air inlet defined in a side thereof and connected to the air outlet, the air duct having an upper surface curved progressively upwardly toward the air outlet.

The air duct of the precleaner has a flange surrounding the air outlet, the air outlet and the air inlet being coupled by the flange, the precleaner engaging the main air cleaner at a position below the air outlet and the air inlet which are coupled to each other.

According to the present invention, there is also provided an air cleaner comprising a cyclon-type precleaner having an air outlet, and a main air cleaner including a case having an air inlet defined in a side thereof and a substantially cylindrical filter housed centrally in the case coaxially with the vertical axis thereof, the air inlet having a central axis sidewardly offset a distance from an axis of the case and connected to the air outlet of the precleaner.

The above and further objects, details and advantages of the present invention will become apparent from the following description of a preferred embodiment thereof, when read in conjunction with the accompanying drawings.

DETAILED DESCRIPTION OF THE PREFERRED EMBODIMENT

Figure 1:
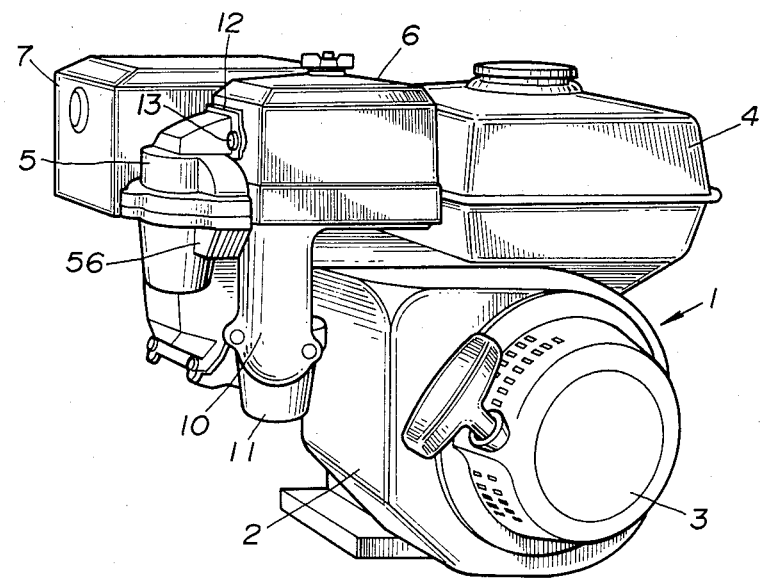
FIG. 1 is a perspective view of a general-purpose internal combustion engine according to the present invention.
Figure 2:
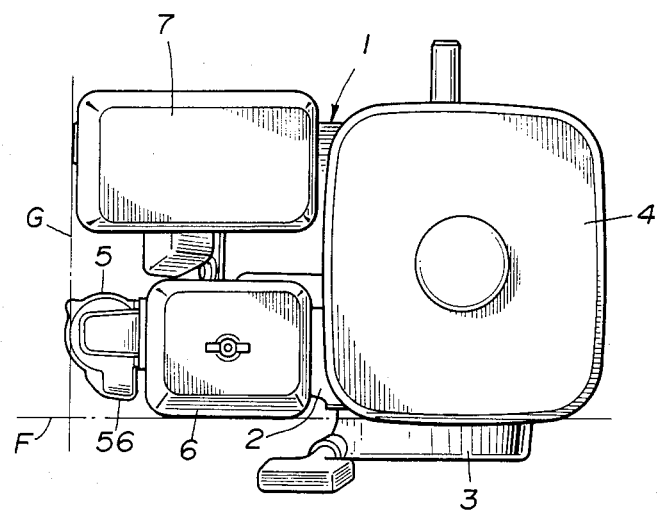
FIG. 2 is a plan view of the general-purpose internal combustion engine.

As shown in FIGS. 1 and 2, a general-purpose internal combustion engine includes an engine unit 1 having an air guide cover 2 disposed on one side thereof in covering relation to an engine cooling fan integral with a flywheel. A recoil starter 3 is attached to the outer surface of the air guide cover 2 in parallel relation to the engine unit 1.

A fuel tank 4 is disposed on the upper surface of the engine unit 1 at one side thereof. A main air cleaner 6 coupled with a cyclone-type precleaner 5 and a muffler 7 are disposed laterally of the fuel tank 4 parallel to each other, the main air cleaner 6 and the precleaner 5 being located closely to the recoil starter 3. Each of the fuel tank 4, the main air cleaner 6, and the muffler 7 is substantially rectangularly shaped when viewed in plan.

Figure 3:
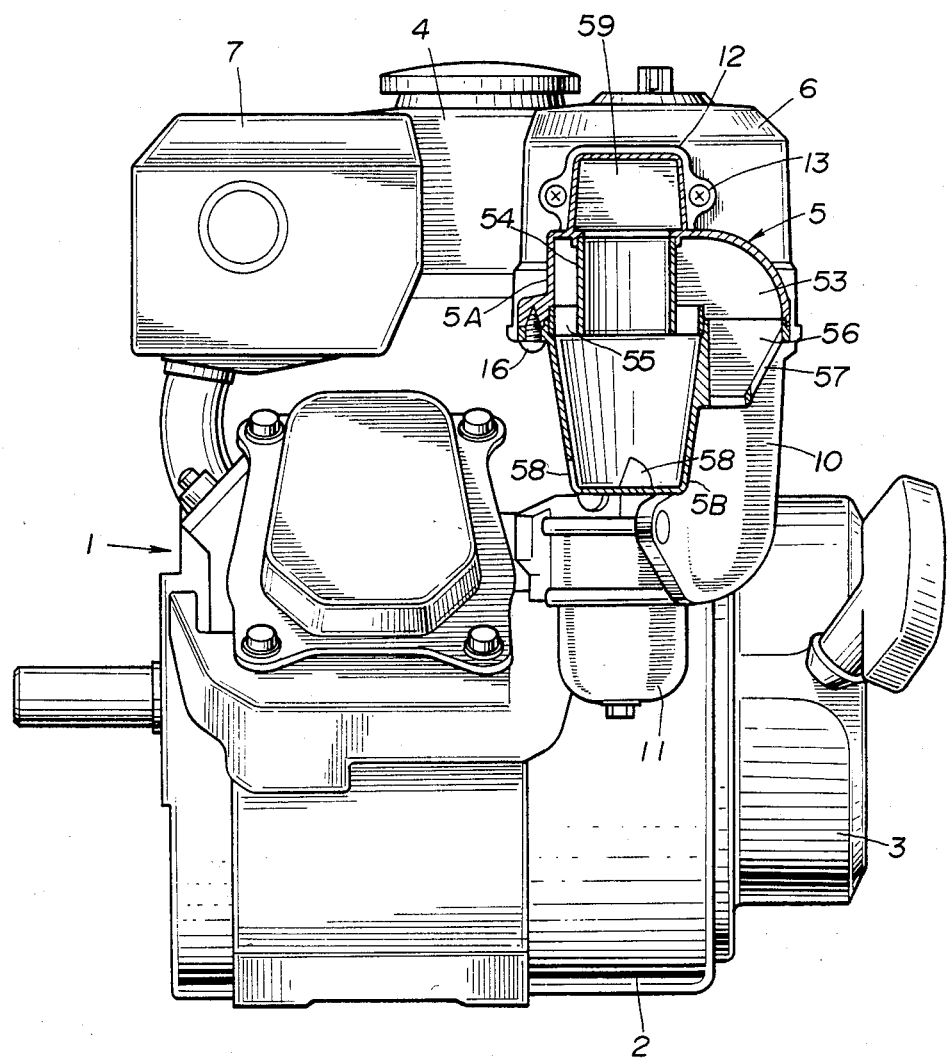
FIG. 3 is an enlarged front elevational view of the general-purpose internal combustion engine, with a precleaner shown in vertical cross section.
Figure 4:
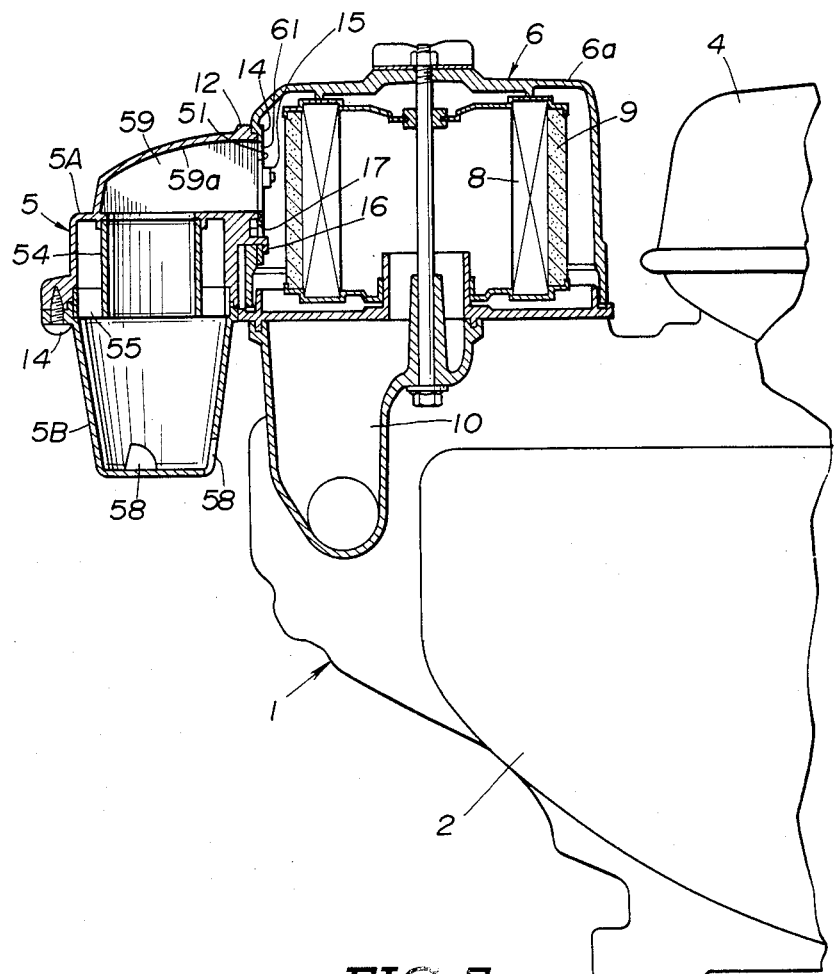
FIG. 4 is an enlarged fragmentary side elevational view of the general-purpose internal combustion engine, with the precleaner and a main air cleaner in vertical cross section.
Figure 5:
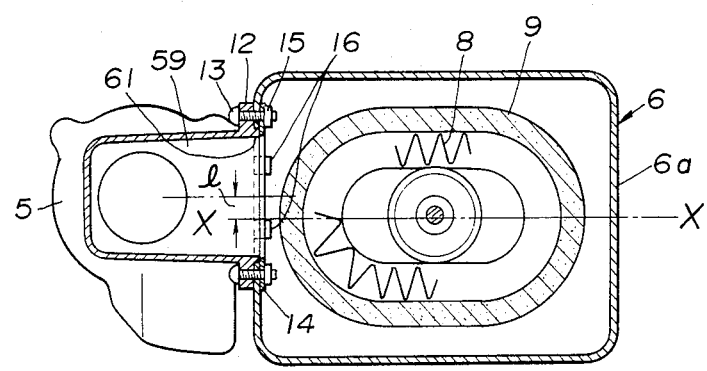
FIG. 5 is a horizontal cross-sectional view of the main air cleaner and the precleaner.

As illustrated in FIGS. 4 and 5, the main air cleaner 6 accommodates a substantially cylindrical or elliptical filter centrally in a cleaner case 6a coaxially with the vertical axis thereof, the cylindrical or oval filter comprising a paper filter member 8 and a urethane foam member 9 surrounding the paper filter member 8. The cylindrical or oval filter has an inner space communicating through an air duct 10 with a carburetor 11 (FIGS. 1 and 3).

As shown in FIG. 5, the main air cleaner 6 has an air inlet 61 defined in a side thereof and having a central axis sidewardly displaced or offset a distance 1 from a horizontal axis X—X of the cleaner case 6a, and the precleaner 5 has an air outlet 51 defined by the outer end of an air duct 59 thereof. The precleaner 5 is attached to the main air cleaner 6 by a flange 12 surrounding the air outlet 51 with the air inlet 61 and the air outlet 51 held in registry with each other. As shown in FIG. 4 and 5, bolts 13 extend through the flange 12 threadedly into nuts 15 on a patch plate 14 disposed in the main air cleaner 6 and held against the inner side thereof in surrounding relation to the air inlet port 61. The precleaner 5 has a pair of hooks 16 (FIGS. 4 and 5) projecting into the main air cleaner 6 below the air outlet 51 and the air inlet 61 and held in engagement with a case of the main air cleaner 6 and an edge of a hole 17 defined in the patch plate 14. The precleaner 5 may have a horizontally elongate single hook rather than the pair of hooks 16.

Figure 6:
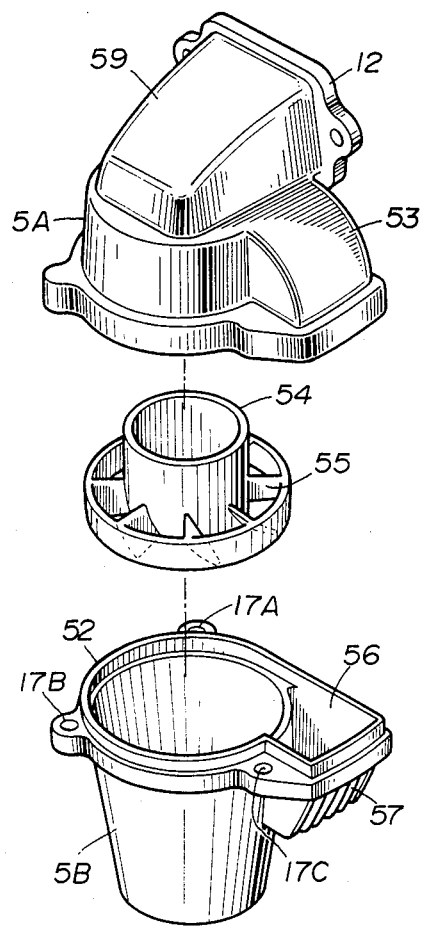
FIG. 6 is an exploded perspective view of the precleaner.
Figure 7:
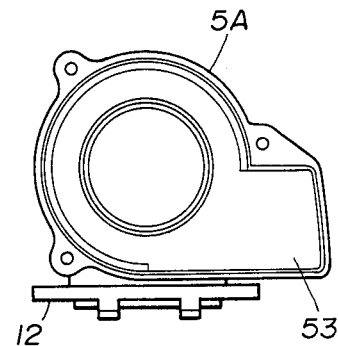
FIG. 7 is a bottom view of a precleaner case.
Figure 8:
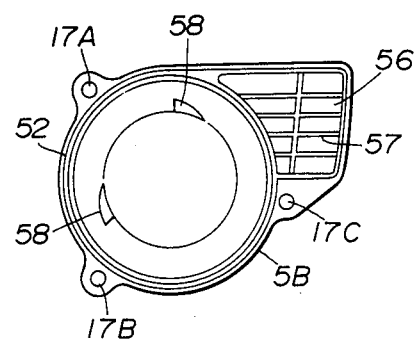
FIG. 8 is a plan view of a dust pan.

As illustrated in FIG. 6, the precleaner 6 comprises an upper cleaner case 5A substantially in the form of a hollow cylinder, and a lower dust pan 5B substantially in the form of a hollow cylinder. The upper cleaner case 5A and the lower dust pan 5B are fitted together through a socket and spigot joint 52 (FIG. 6) and fastened together by a plurality of screws 16. (FIGS. 3 and 4).

The air duct 59 is integral with the upper cleaner case 5A and has an upper surface 59a which is gradually curved progressively upwardly toward the main air cleaner 6.

The upper cleaner case 5A has an integral air inlet duct 53 projecting tangentially outwardly and opening downwardy. An air guide sleeve 54 with a plurality of revolving guide blades 55 integrally formed therearound is removably fitted centrally in the upper cleaner case 5A.

The lower dust pan 5B has an integral air inlet member projecting laterally outwardly tangentially therefrom and opening upwardly. The air inlet member defines an an air inlet port 56 held in registry with the open end of the air inlet duct 53. The air inlet port 56 opens obliquely downwardly remotely from the muffler 7 through a grid 57.

Figure 9:
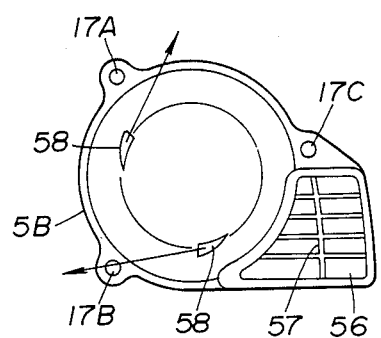
FIG. 9 is a bottom view of the dust pan.

The air inlet duct 53 and the air inlet port 56 are joined through a socket and spigot joint contiguous to the socket and spigot joint 52. The dust pan 5B has a plurality of dust outlet holes 58 defined in the bottom thereof along its peripheral edge. The dust outlet holes 58 are directed away from the air inlet hole 56 so that dust discharged from the dust outlet holes 58 will not be directed toward the air inlet hole 56 as indicated by the arrows in FIG. 9.

The dust pan 5B have screw holes 17A, 17B, 17c which are spaced at irregular intervals so that the air inlet port 56 and the dust outlet holes 58 will properly be positioned with respect to each other when the cleaner case 5A and the dust pan 5B are coupled by screws through the screw holes 17A, 17B, 17C.

With the cyclone-type precleaner 5 mounted on the main air cleaner 6, the air inlet port 56 of the precleaner 5 is positioned remotely from the muffler 7 as shown in FIG. 1 and 2, and does not project out of a plane F in which sides of the main air cleaner 6 and the fuel tank 4 lie. The precleaner 5 also does not project out of a plane G extending perpendicularly to the plane F and in which the end face of the muffler 7 lies. The fuel tank 4, the main air cleaner 6 with the precleaner 5 attached thereto, and the muffler 7 are positioned in a substantially rectangular space as seen in plan.

When the engine operates, dust-laden air is introduced through the air inlet port 56 into the precleaner 5 and caused to revolve by the tangential duct 53 and the revolving guide blades 55. Dust of a large specific gravity such as sand particles drops along the inner wall surface of the dust pan 5B and is discharged out of the dust pan 5B through the dust outlet holes 58. Air from which most dust has been removed is drawn upwardly through the central air guide sleeve 54 and then through the duct 59 and the ports 51, 61 into the main air cleaner 6, in which the air is purified by the filter members 8, 9. Since the air inlet 61 of the main air cleaner 6 having a central axis sidewardly offset the distance l of the horizontal axis X - X thereof, the air having entered the main air cleaner 6 is caused to flow along the inner peripheral surface of the cleaner case 6a. Therefore, dust can be removed form the air by the cyclonic action, and the air can be filtered through the entire circumference of the filter. Thus, the filter is prevented from being locally clogged with dust. The interval for cleaning or replacing the filter is increased, and the air purifying efficiency of the filter is also increased. The filter is accordingly economical in use.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

We claim:

1. A general-purpose internal combustion engine comprising:
    an engine unit having a crank case and a cylinder;
    a recoil starter disposed adjacent and coaxially with respect to said engine unit;
    a fuel tank disposed over said crank case;
    a main air cleaner and a muffler disposed on said engine unit laterally of said fuel tank in parallel relation to each other, said main air cleaner being located closely to said recoil starter, said muffler being disposed remotely from said recoil starter and above said cylinder;
    a precleaner connected to said main air cleaner and having an air inlet member disposed remotely from said muffler, said precleaner comprising an upper cleaner case and a lower dust pan which are detachably coupled to each other, said upper cleaner case having an air inlet duct projecting laterally and having a lower open end, said dust pan having said air inlet member which projects laterally and opens upwardly, said air inlet member defining an air inlet port directed substantially downwardly, said cleaner case and said dust pan being coupled together, with said air inlet duct and said air inlet member held in registry with each other.

2. A general-purpose internal combustion engine according to claim 1, wherein each of said fuel tank, said muffler, and said main air cleaner is substantially rectangularly shaped as viewed in plan.

3. A general-purpose internal combustion engine according to claim 1, wherein said air inlet duct and said air inlet member project tangentially from said cleaner case and said dust pan, respectively, said dust pan having a dust outlet hole defined in a bottom thereof and opening away from said air inlet port.

4. A general-purpose internal combustion engine according to claim 1, wherein said precleaner has an integral air duct at its upper portion, said air duct having an air outlet at an outer end thereof, said main air cleaner having an air inlet defined in a side thereof and connected to said air outlet, said air duct having an upper surface curved progressively upwardly toward said air outlet.

5. A general-purpose internal combustion engine according to claim 1, wherein said air duct of said precleaner has a flange surrounding said air outlet, said air outlet and said air inlet being coupled by said flange, said precleaner engaging said main air cleaner at a position below said air outlet and said air inlet which are coupled to each other.

6. A general-purpose internal combustion engine according to claim 1, wherein said main air cleaner has an oval filter disposed centrally therein in alignment with a vertical axis thereof, said air inlet having a central axis sidewardly offset a distance from a horizontal axis of said warm air cleaner.

* * * * *